United States Patent [19]

Sweeney et al.

[11] Patent Number: 4,893,925
[45] Date of Patent: Jan. 16, 1990

[54] OPTICAL MEASUREMENT SYSTEM FOR A DISPLAY INTERFACE UNIT

[75] Inventors: Kevin T. Sweeney, Hicksville; Joseph P. Mattal, Smithtown; Mitchell L. Kushner, Bayside; Robert H. Lemke, Huntington Station, all of N.Y.

[73] Assignee: Grumman Aerospace Corporation, Bethpage, N.Y.

[21] Appl. No.: 199,075

[22] Filed: May 26, 1988

[51] Int. Cl.$^4$ ............... H04N 17/04; G01N 21/84
[52] U.S. Cl. .................... 356/72; 324/404; 358/139
[58] Field of Search ............ 356/72; 358/139; 324/404

[56] References Cited

U.S. PATENT DOCUMENTS 4,400,731  8/1983  Brown .................... 358/139
4,752,825  6/1988  Buckley et al. ............ 324/404 X Primary Examiner—Vincent P. McGraw
Attorney, Agent, or Firm—Pollock, VandeSande & Priddy

[57] ABSTRACT

Prior art instruments for testing a display unit suffer from the disadvantage that a testing system has to be customized for each type of display unit. The present invention optical measurement system, by utilizing an optical sensor, a three-dimensional transport system and a focus lens, provides for a universal system which is adaptable to test all kinds of display units. To provide for mobility and compactness, the optical sensor, the transport mechanism, the focus lens, in addition to the electronic circuit cards for controlling the motions thereof, are all mounted within a movable cart. To ensure that all kinds of display units may be tested on the same cart, a pivotable mirror assembly is mounted to the cart, with its line of sight axis aligned, closely to the screen of any to be tested display unit, such that the output from the display unit is reflected onto the focus lens and subsequently measured by the optical sensor.

20 Claims, 4 Drawing Sheets

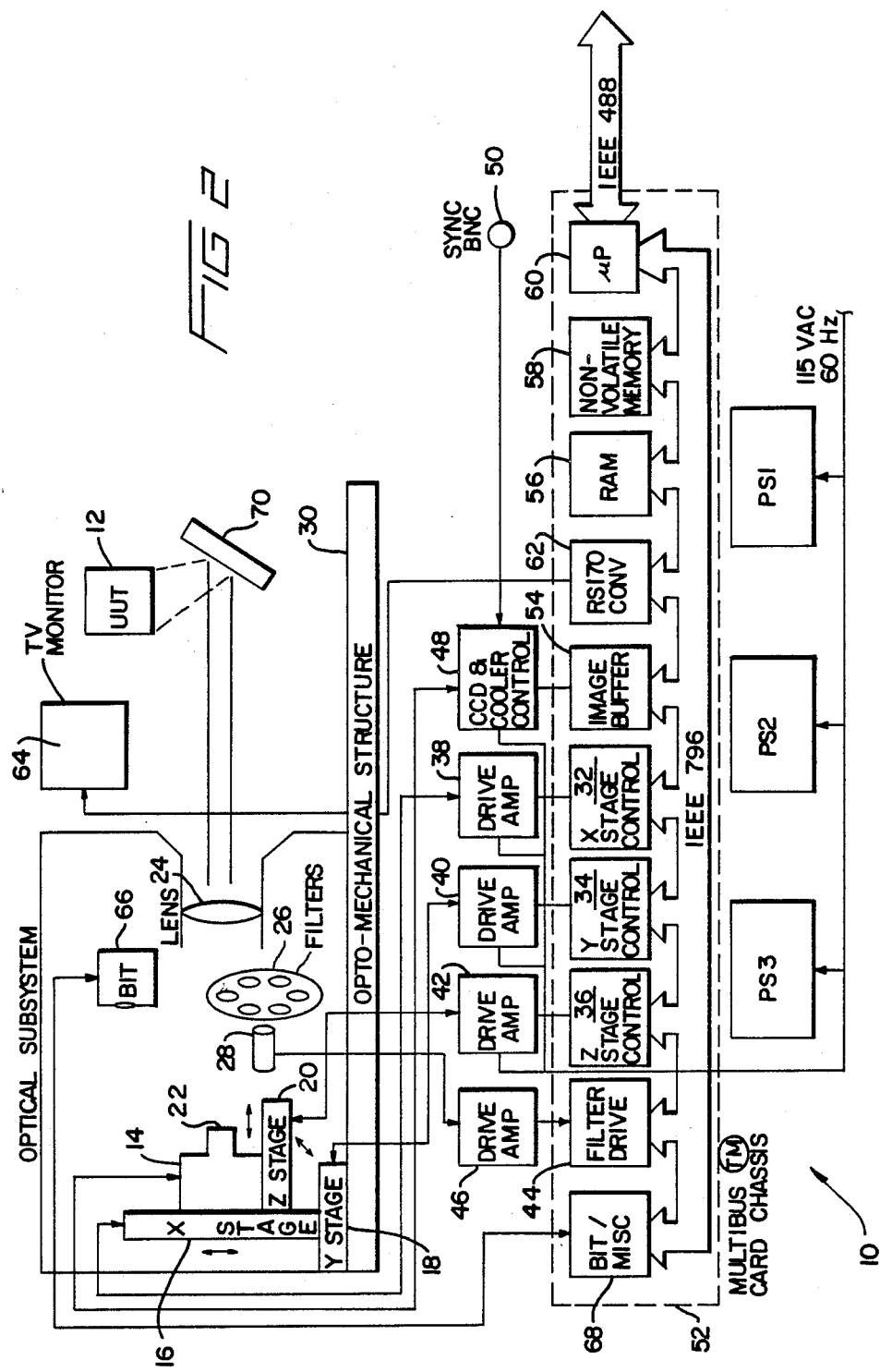

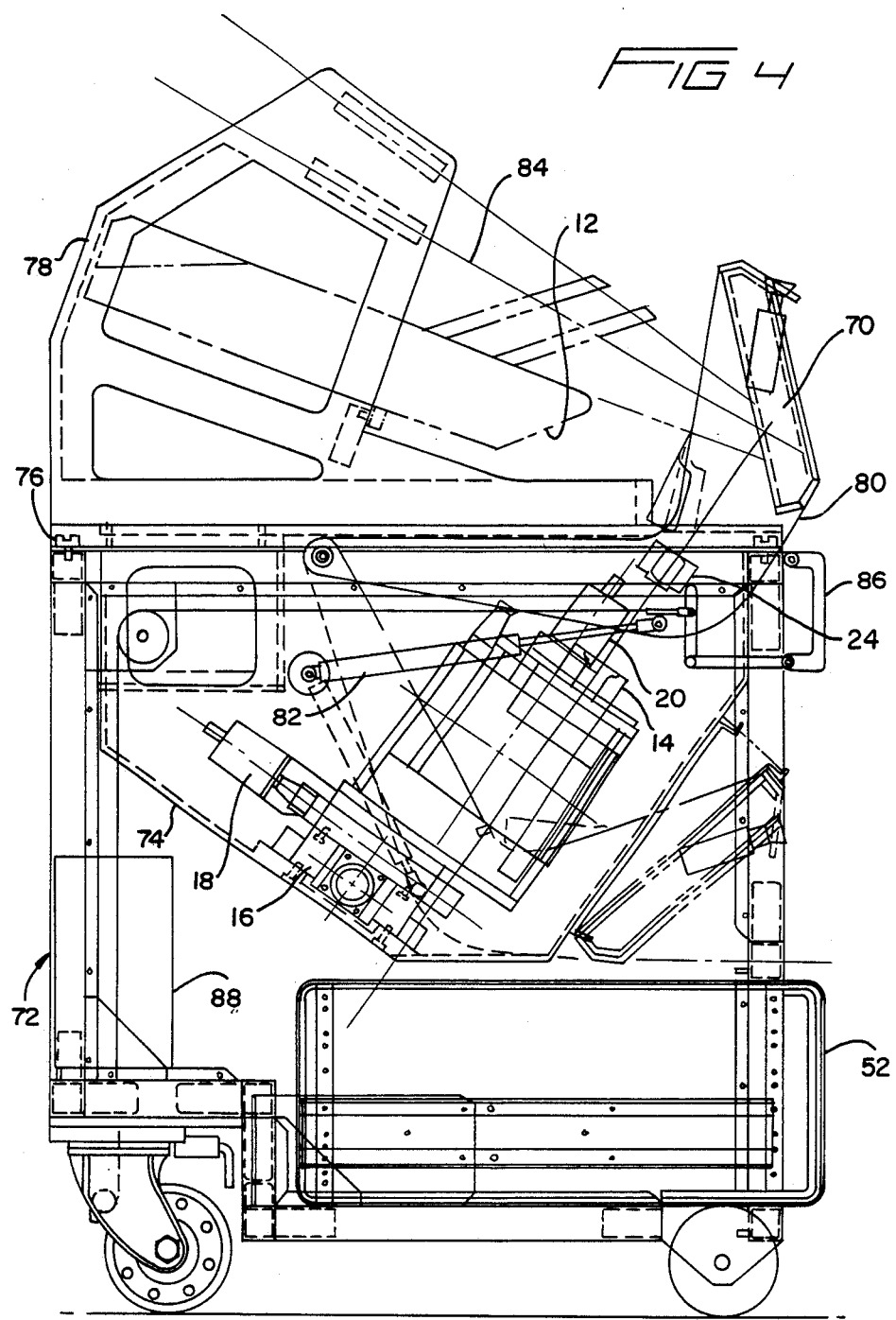

OPTICAL MEASUREMENT SYSTEM FOR A DISPLAY INTERFACE UNIT

FIELD OF THE INVENTION

The present invention relates to display interface units and more particularly to an optical measurement system which provides for the automatic assessment of the optical output of a CRT display unit connected to and to be tested by the display interface unit.

BACKGROUND OF THE INVENTION

The use of cathode ray tube (CRT) displays for providing man/machine interface for avionic systems has grown dramatically in recent years. Many such systems are now in place and, in practice, new aircraft are being outfitted, as replacement of electro-mechanical devices, with CRT displays. Consequently, today's aircraft systems are controlled and monitored mainly by the pilot via CRT interaction. In other words, displays are flight critical in modern aircraft.

Traditionally, evaluation of the electro-optical parameters or characteristics of CRT type displays have been performed by using conventional laboratory type optical test equipment such as theodolites, collimators, microscopes and photometers. Such testing is often tedious and time consuming. Besides, in the military support environment, this testing is oftentimes performed by a person who has had minimal experience in optical testing techniques. As a consequence, the subjective interpretation of the results, as in the cases of acuity and gray scale evaluation, differs from one operator to the next, thereby leading to low throughput.

Moreover, since there is a myriad of display units present in an aircraft, typically, individualized testing equipment is needed for each of the display units. For example, a particular testing equipment may be used for a heads-up display while a different testing equipment may be needed for the direct viewing display in an aircraft. And inasmuch as the testing equipment are different, different test approaches are taken. Thus, a proliferation of unique testing equipment, along with the supporting software, ensues.

OBJECTIVES OF THE INSTANT INVENTION

It is thus an objective of the instant invention to provide for a universal automatic testing equipment adaptable to test different display units.

It is another objective of the present invention to have the automatic testing equipment provide objective evaluations for the different display units under test.

It is yet a further objective of the present invention to adapt the present invention automatic testing equipment as an adjunct to a main automatic testing equipment which may also be used to test instruments other than display units.

It is yet a furthermore objective of the present invention to provide an automatic testing equipment which is portable, compact, and capable of supporting the display unit that is being tested so that, if needed, repair of the display unit can be effected right on the test equipment.

BRIEF DESCRIPTION OF THE INVENTION

The present invention optical measurement system, hereinafter referred to as OMS, is but a part of a display interface unit (DIU), which has as its other main component a video generating system (VGS). The DIU is a device which provides automatic testing for a wide range of both direct and heads-up monochromatic or color displays. It is also adaptable to a variety of automatic testing equipment (ATE) hosts. To test a particular display Unit Under Test (UUT), the VGS would supply stimuli to the UUT while the OMS makes an automatic assessment of the optical output, or characteristics, of the display unit.

Briefly, although not limited to, the OMS is interested in obtaining the luminance, geometry and resolution of a particular display unit under test. To achieve this end, the present invention OMS utilizes a charge coupled device (CCD), in particular, the pixel array resident therein, to dissect any chosen area within a UUT screen image. There is sufficient image assessment spatial bandwidth in the CCD so that the acuity of even high resolution UUTs can be evaluated. Furthermore, by using a three-axis linear positioning mechanism, the image sensing CCD may be moved so as to test any chosen area of the UUT screen at a wide variety of magnification factors. Accordingly, a so-called "step-stare" measurement may be effected for testing each and every area of the UUT screen for both Heads Up Display (HUDS) and Direct Displays.

To afford sufficient dynamic range and colorimetric measurement capability for covering the different types of UUTs, a filter wheel assembly, containing both neutral density filters and spectral filters, is added to the present invention OMS. To permit compact packaging and to ensure that UUTs of different sizes may be objectively tested, a swingable mirror assembly for reflecting the image produced by the UUTs to the CCD sensor is also employed. By combining the above-cited essential elements into a single system, various types of display units may be tested.

The above-mentioned objects and advantages of the present invention will become more apparent and the invention itself will be best understood when considered in conjunction with the accompanying drawings, in which:

BRIEF DESCRIPTION OF THE DRAWINGS

FIG. 2 is a block diagram schematic of the present invention optical measurement system;

FIG. 4 is a side view of a cart carrying therein the present invention optical measurement system;

DETAILED DESCRIPTION OF THE PRESENT INVENTION

Figure 1:
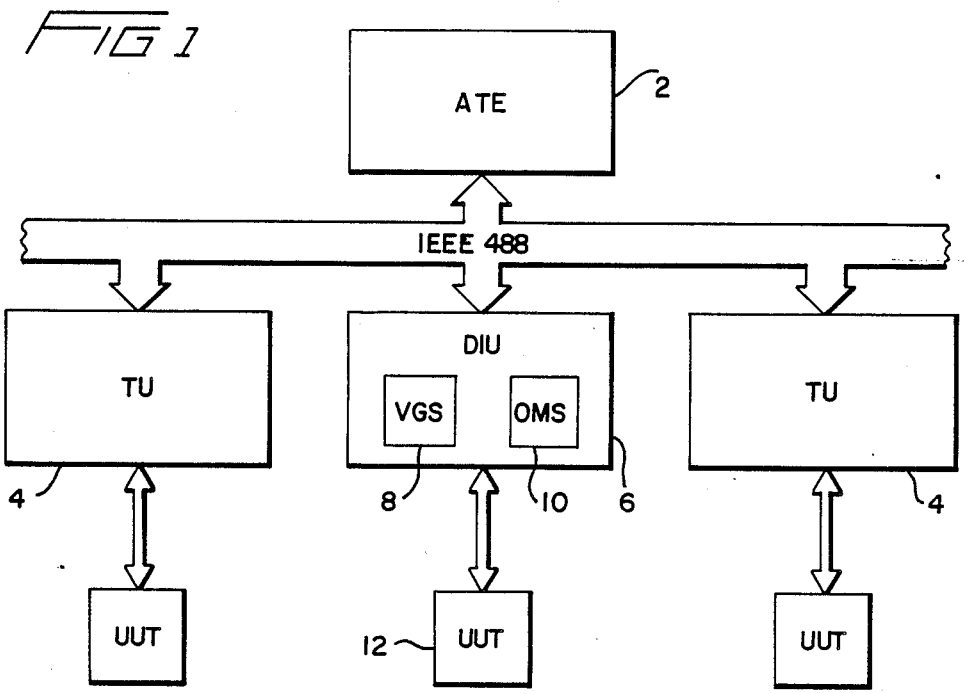
FIG. 1 is a simplified block diagram showing the relationship between an automatic testing equipment and the present invention optical measurement system.

FIG. 1 illustrates the relationship between an automatic testing equipment (ATE) 2 and various testing instruments (TU) 4 which may be connected thereto by means of an IEEE 488 bus. As shown, the TUs, which may be different testing instruments, are connected both to ATE 2 and corresponding units under test (UUT).

Also shown is a display interface unit (DIU) 6 which has a video generating system (VGS) 8 and an optical measurement system (OMS) 10. DIU 6 is connected to ATE 2 and a unit under test 12 (UUT), whose response to stimuli transmitted thereto from VGS 8 are measured by OMS 10 and fed to ATE 2.

In practice, UUT 12 may be a heads-up display (HUD), a monochromatic CRT or a color CRT. The stimuli transmitted to UUT 12 by VGS 8 may include video symbols which are necessary to put specific information up on the CRT display. Such a VGS system is similar to that described in copending application Ser. No. 917,742, now patent No. 4,752,825, entitled "Video Display Simulator and Analyzer" by Buckley, et al., and assigned to the same assignee as the instant invention.

Upon receiving the stimuli, the screen of UUT 12 outputs a number of optical symbols (or targets) which may include, for example, luminance, geometry and resolution symbols (or targets). Since different types of display units possess different output characteristics, in order to effect a truly universal DIU, OMS 10 has to be adaptable to measure these different optical characteristics.

Consider now FIG. 2 wherein subsystem OMS 10 of DIU 6 is illustrated in a block format. As shown, OMS 10 has a sensing system (sensor) 14 which is comprised of a charge coupled device (CCD). Besides the CCD, sensor 14 also has cooling means resident thereon for maintaining the temperature of the CCD constant. Sensor 14 is mounted onto a three-axis positioning mechanism which, for sake of simplicity, is illustrated as an xstage driver 16, a y-stage driver 18 and a z-stage driver 20. As should readily be appreciated, stage drivers 16, 18 and 20 provide three-dimensional movement for sensor 14, which is a high pixel density (having pixels of approximately 7 microns by 7 microns) scientific grade charge coupled device. Accordingly, there is a plurality of picture elements at a detector array 22 of sensor 14. These picture elements, more in particular the pixels of the array, as is well known, are used as detectors for detecting and measuring light and the amount of light, respectively, projected thereagainst.

Facing detector array 22 of sensor 14 is a focus lens 24 which focuses light projected thereat onto detector array 22. Interposed between lens 24 and sensor 14 is a filter wheel assembly 26 which includes neutral density filters and chromaticity correction filters. Although only one wheel is shown, in actuality, different wheels containing the different types of filters may be used. As is well known, the neutral density filters are used to attenuate the incoming light in steps so as to allow the radiation reaching sensor 14 to be within the latter's dynamic range. Putting it simply, the purpose of the neutral density filters is to expand the total dynamic range of sensor 14 for luminance, geometry and resolution measurements. The chromaticity correction filters, on the other hand, are used to change the spectral responsivity characteristics of sensor 14 for matching the color vision response of the human eye. Thus, by using the different green, blue and red filters, sensor 14 can effect color measurements for a color CRT display. As shown, filter assembly 26 is rotated by means of a stepper motor 28. Structurally, the abovediscussed components are mounted onto an opto-mechanical structure 30.

To drive x-stage driver 16, y-stage driver 18 and z-stage driver 20 for moving sensor 14, x-control circuit 32, y-control circuit 34 and z-control circuit 36, respectively, are used. To provide for the necessary amplified signals, drive amplifiers 38, 40 and 42 amplify the respective signals outputted from control circuits 32, 34 and 36. X-stage control circuit 32, y-stage control circuit 34 and z-stage control circuit 36 also include indexes which provide digital information to respective drive amplifiers 38, 40 and 42 for specifically identifying the drive power, feedback control and indexing control of corresponding x-stage driver 16, y-stage driver 18 and z-stage driver 20. For movement, the three-axis stage drivers are stepper motors which include position feedback.

As was discussed previously, filter wheel assembly 26 is controlled by motor 28, which in turn is driven by filter drive 44, whose signal is amplified by drive amplifier 46. The respective drivers and amplifiers are conventional devices and are provided, collectively, by The Daedal Corporation of Harrison City, Pennsylvania.

Further shown in the FIG. 2 block schematic is a CCD and cooler control circuit 48, which is used to control sensor 14 and to cool the same. Shown connected to the CCD control circuit 48 is a SYNC BNC input 50 for synchronizing sensor 14 with UUT 12. SYNC BNC 50 is necessary inasmuch as CCD sensor 14 is not a real time imaging system and the CRT of UUT 12 is a time dependent intensity device. In other words, since sensor 14 can be equated as a shutter operated system while CRT UUT 12 is a time dependent system, UUT 12 has to be synchronized with sensor 14 so that an integer number of frames, during the CRT operating cycle, may be taken.

Like the previously discussed controllers and amplifier circuits, sensor 14, sensor control circuit 48 and sync BNC 50 may be purchased from The Photometrics Company.

As shown, the x, y and z control circuits 32, 34 and 36, as well as filter drive 44, are clustered (in actuality, inserted as circuit cards) within a MULTIBUS card chassis 52, designated by the dotted line box. Also included in MULTIBUS card chassis 52 is an image buffer 54 which provides the digital interface between CCD controller 48 and MULTIBUS card chassis 52 for converting the image received from sensor 14. Incidentally, the analog image received from sensor 14 is converted by CCD controller 48 digitally before the same is passed on to image buffer 54.

Also included in MULTIBUS card chassis 52 are memories RAM 56 and non-volatile memory 58. RAM 56, for this embodiment, is a four megabyte memory which stores the current test images and reduced image data. Nonvolatile memory 58, on the other hand, provides storage for calibration constants and resident programs for image processing algorithms and positional movements, examples of which are discussed hereinbelow, for operating the system. It should be appreciated that such positional movement software programs are well known. It should further be appreciated that the calibration constants provide correction for variations in performance of the sensor 14, filters 26 and the lens 24 over the entire range of device operation. Controlling the different memories and controllers is a microprocessor controller 60 which, for this embodiment, is a Motorola 68000 microprocessor.

Further included in MULTIBUS chassis 52 is a RS170 converter circuit 62 whose purpose is to convert the image, taken by sensor 14 and stored in RAM 56, for viewing in a TV monitor 64, in order to remotely monitor the images being picked up by sensor 14.

To provide self-testing for the system, a built in testing block (BIT) 66 is shown to be connected to a BIT/MISC circuit 68, residing in MULTIBUS card chassis 52. BIT 66 provides for a uniform illumination of sensor 14 when the latter is brought to a specific location relative to the former. From this uniform illumination, the performance of sensor 14 is verified. For the FIG. 2 embodiment, BIT 66 may be composed of a light emitting diode and silicon detector, manufactured by The Hewlett Packard Company. To provide a reference standard for calibrating the responsivity of sensor 14 and for controlling the illumination of BIT 66, BIT/MIS control circuit 68 is used.

The image buffer 54, converter circuit 62, RAM 56, non-volatile memory 58, microprocessor 60 and sensor 14 can all be purchased from The Photometrics Company of Tuscon, Arizona. To provide power for the different controllers and amplifiers, three power supplies PS1, PS2 and PS3 are used. Power supply PS1 provides +5 volts for the different circuits, resident in MULTIBUS card chassis 52. Power supply PS2 provides +12 volts for the different circuits. And power supply PS3, which is supplied by The Photometrics Company, provides the power to both drive and cool sensor 14.

Also shown in FIG. 2 is a mirror 70 (the construction of which will be further discussed later with FIG. 4) which, as illustrated, reflects the output produced by UUT 12 to lens 24.

Figure 3:
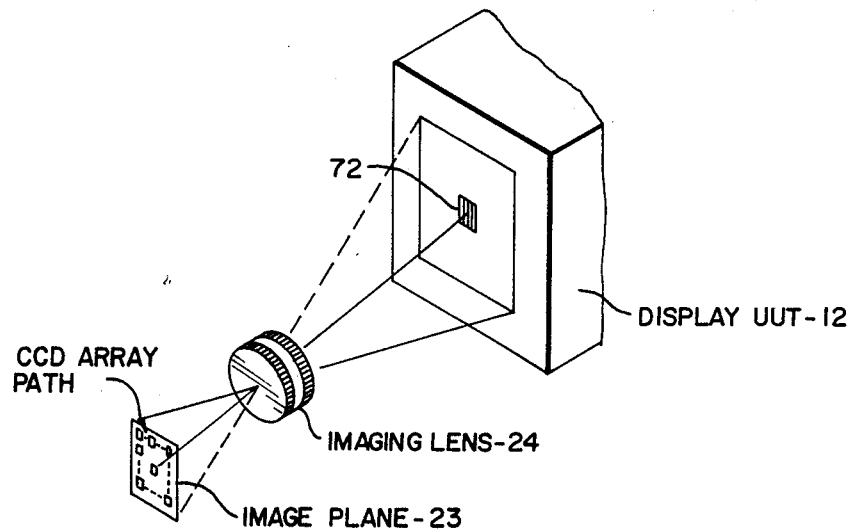
FIG. 3 is a perspective illustration of the imaging of a certain portion on the screen of a display unit onto the sensor CCD arrays of the instant invention optical measurement system.

Referring also to FIG. 3, which does not include mirror 70 for the sake of clarity, for explanation, the present invention optical measurement system operates as follows. The screen from display UUT 12 is reimaged, by means of lens 24 (after having been reflected by mirror 70) onto the image plane, i.e., focal plane, 23 of lens 24. For the instant invention embodiment, image plane 23 is considered to be reasonably large, for example, having a dimension of four inches by four inches. As can be seen in FIG. 3, a shaded portion 72 from the screen of UUT 12 is imaged onto the array of sensor 14. And since sensor 14 is mounted onto a three-dimensional movable assembly, a target anywhere on the viewing area of display unit 12 may be projected onto image plane 23. Hence, by sequentially generating targets (by means of VGS 8) and moving sensor 14 (bY means of x, y and z stage drivers 16, 18 and 20), every portion of the viewing area of display unit 12 can be viewed. Thus, a "step-stare" process whereby sensor 14 may be stepped, so as to receive in the image plane 23 corresponding output characteristics for each portion of the viewing area of display unit 12 for evaluation can be effected. In other words, once the optical characteristics of a chosen area of the CRT of display unit 12 have been measured (and stored as an image frame into RAM 56), sensor 14 may be stepped to a different area on the CRT so that, if done sequentially, every area of the CRT of display unit 12 will eventually be covered; and, thus, the three important optical characteristics mentioned previously, that is, the luminance, geometry and resolution of a display unit under test can be measured.

In the case of measuring the luminance of a particular display unit, the following steps are taken by the present invention optical measurement system. A uniform brightness target is first put on the CRT of the unit under test. Next, the sensor is positioned and may, for example, be focused onto the upper left-hand corner of the CRT of the display unit. And an evaluation is made of the brightness of the screen at that particular location by the system. Afterwards, sensor 14 may be stepped along horizontally to an adjacent area on the screen and the brightness of this adjacent area is measured. This process is repeated across the screen and then sequentially down in rows such that data pertaining to the different areas are accumulated. And by evaluating the thus accumulated data, the luminance uniformity of the screen of the display unit under test is ascertained.

In the instance of determining the geometry of the screen, the present invention system can generate a plurality of symbols, for example, hypothetical small crosses. Again, by starting at the upper left-hand corner of the screen and by transporting sensor 14 to the position for intercepting the image reflected therefrom, the exact coordinates of sensor 14, in the x, Y and z axes, relative to the pixels of sensor 14 are determined. For example, if the pixels of sensor 14 and the crosses generated on the screen of the display unit are perfectly aligned, then it can be assumed that the screen of the display unit, at least for that chosen area, is perfect in terms of geometry. Putting it differently, the intersection of the target cross should fall exactly on the center pixel. If it doesn't, then since the stage drivers have been sent to a location where perfect alignment is to be expected, any space between the CCD center pixel and the target cross on the screen of the display unit suggests that there is a misalignment and that the geometry for that area of the screen of the display unit is not perfect. And by plotting the alignment of the different areas of the screen, an indication of the linearity of the CRT screen can be determined.

The resolution of the CRT is a combination of the luminance and geometry of the screen. To test for the resolution, a bar pattern, for example, a series of light and dark patches on the face of the screen, is generated. The luminance of the respective patches are then recorded and the linewidth, modulation or edge slope of the images are evaluated for effecting the measurement of the resolution of the CRT.

Of course, it should be appreciated that for different types of display units, different basic calibration units, which, as discussed earlier, may be stored in nonvolatile memory 58, are used. Accordingly, different display units, including heads-up displays, can be tested by the instant invention optical measurement system, which becomes an adjunct to the automatic testing equipment as discussed hereinbelow.

Figure 5:
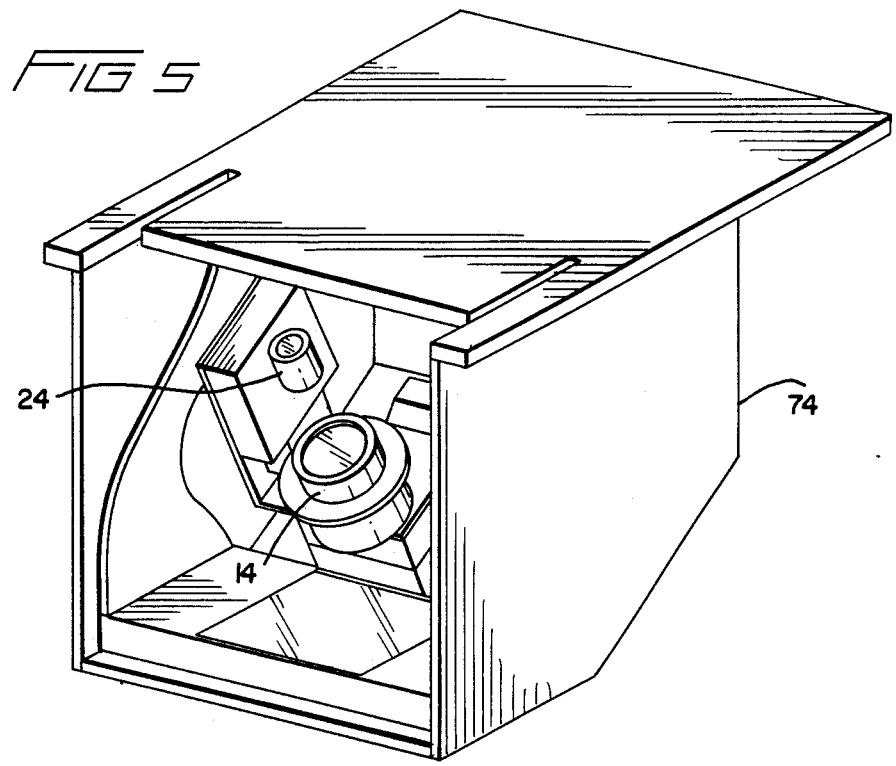
FIG. 5 is a perspective view of an isolation compartment within the FIG. 4 cart.

Referring to FIG. 4, there is shown a cross-sectional view of a mobile cart which has incorporated therein the components shown in FIG. 2. In particular, as shown, cart 72 has integrally mounted therein a compartment 74. See also FIG. 5. Within compartment 74 are lens 24, sensor 14 (including the cooler thereof) and the three-axis stage drivers 16, 18 and 20. Compartment 74 is mounted to cart 72 using isolation mounts 76. Mounted onto the surface of compartment 74 is a bracket 78, which may be suitably positioned along the surface of compartment 74 for embracing a to be tested display unit, for example, a heads-up display 12, shown by the dotted line.

Figures 6A, 6B:
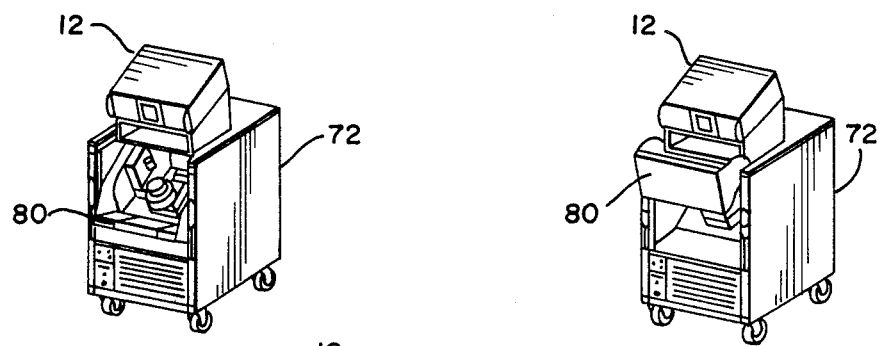
FIGS. 6a to 6c illustrate the movement of a swingable mirror assembly, built into the FIG. 4 cart, relative to a display unit under test placed on top of the cart.
Figure 6C:
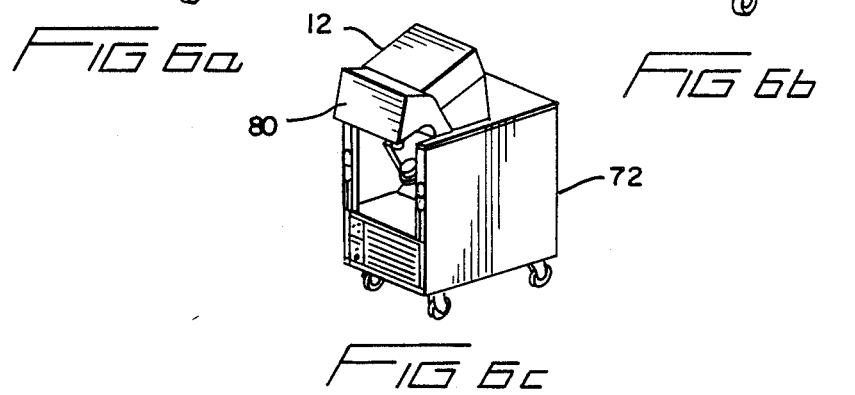

Pivotally mounted to compartment 74 is a mirror assembly 80 which has as its reflective surface mirror 70. As shown in FIGS. 4 and 6a to 6c, mirror assembly 80, supported by air spring 82, may be swung, from its position shown in FIG. 4 and 6c to the position shown in FIG. 6a. When mirror assembly 80 is swung to its fully extended position, illustrated in FIGS. 4 and 6c, mirror 70 provides an optical line of sight along axis 84 so that the screen of the display unit is brought closely to the mirror and the output thereof is projected, through lens 24, onto detector array 22 of sensor 14. Thus structured, cart 72 provides for a highly compacted testing equipment which can easily be stowed away. As mirror assembly 80 can be swung to a retracted position, as shown in FIG. 6a, if a display unit has been ascertained not to be in perfectly working order, instead of having to remove this display unit to a different work station, the display unit can be repaired right on the cart, provided mirror assembly 80 has been swung to its retracted position. After repair, the unit can again be tested by simply swinging mirror assembly 80 to its extended position.

To prevent cart 72 from rolling, as for example, when it is stowed on board of an aircraft carrier for testing aircraft displays thereon, the wheels of the cart are locked until handle 86 is pulled. Further shown in FIG. 4 are the MULTIBUS card chassis 52, for storing the respective cards circled by the dotted line in FIG. 2, and compartment 88 for storing the different amplifier circuit cards. Since the sensor, the lens, the mirror assembly and the three dimensional transport mechanism are all mounted within compartment 74 and the to be tested display unit is positioned on the surface thereof, the different components are isolated from shocks or external loads applied against cart 72. Thus, no relative motion exists between the unit under test and the optical sensor.

Having thus described the present invention, it should be appreciated that inasmuch as the present invention is subject to many variations, modifications and changes in detail, it is intended that all matters described throughout this specification and shown in the accompanying figures be interpreted as illustrative only and not in a limiting sense. Accordingly, it is intended that the invention be limited only by the spirit and scope of the appended claims.

We claim:

1. Apparatus for evaluating optical characteristics provided by a stationary display unit under test, comprising:
   means for sensing optical characteristics of the viewing area of the display unit, the sensing means having a field of view and a plurality of detectors resident within the field of view responsive to the optical characteristics;
   focus means interposed between the display unit and the sensing means;
   means for positioning the sensing means relative to the focus means along three directions such that any to be evaluated portion of the viewing area of the display unit can be chosen and projected onto the field of view of the sensing means;
   whereby the optical characteristics of any chosen to be evaluated portion are measured by the detectors and evaluated by prestored image processing algorithms to determine the optical performance of the display unit.

2. Apparatus according to claim 1, further comprising:
   reflecting means swingable positioned proximate to the viewing area of the display unit for directing the output from the viewing area to the sensing means.

3. Apparatus according to claim 1, further comprising:
   filter means working cooperatively with the sensing means for providing dynamic range and spectral response controls for the sensing means.

4. Apparatus according to claim 1, wherein the sensing means comprises a charged couple device having arrays of detectors made up of pixels.

5. Apparatus according to claim 1, wherein the focus means comprises a focus lens.

6. Apparatus according to claim 1, wherein the positioning means comprises an x-axis driver stage, a yaxis driver stage and a z-axis driver stage for providing the sensing means three-dimensional movement along the three direction.

7. Apparatus according to claim 1, wherein the optical characteristics comprise luminance, geometry and resolution.

8. Apparatus according to claim 1, further comprising:
   filter means interposed between the focus means and the sensing means for expanding the dynamic range of the sensing means and for changing the spectral responsivity characteristics of the sensing means to effect color measurements.

9. Apparatus according to claim 8, wherein the filter means comprises neutral density filters and chromaticity correction filters.

10. Apparatus for enabling an automatic testing equipment to evaluate optical characteristics provided by a stationary display unit in response to stimuli fed thereto, the apparatus comprising:
    a portable cart;
    means for sensing the optical characteristics of chosen to be evaluated portions of the viewing area of the display unit secured within the cart, the sensing means having a field of view and a plurality of detectors resident within the field of view which are responsive to the optical characteristics;
    focus means placed in front of the sensing means;
    reflective means swingably positionable in front of the viewing area of the display unit for reflecting the viewing area to the focus means; and
    means for positioning the sensing means relative to the focus means along three directions such that any one of the to be evaluated portions of the viewing area of the display unit can be chosen and projected onto the field of view of the sensing means;
    whereby the optical characteristics of the chosen portion are measured by the detectors and evaluated by image processing algorithms for determining the optical performance of the display unit.

11. The apparatus according to claim 10, further comprising:
    a compartment having a surface onto which the display unit is placed being securely integrated into the cart, the sensing means being fixed within the compartment, the compartment isolating the sensing means from shocks and vibrational disturbances effecting the cart.

12. The apparatus according to claim 11, wherein the cart further comprises:
    a bus rack for storing various electronics components and controls for the apparatus.

13. The apparatus according to claim 10, wherein the sensing means comprises a high pixel density charge coupled device.

14. The apparatus according to claim 11, wherein the reflective means comprises a mirror assembly which can be swung completely away from the surface of the compartment so that the display unit placed on the surface of the compartment can be directly worked thereon.

15. The apparatus according to claim 10, wherein the positioning means comprises drive mechanisms for moving the sensing means in x, y and z directions relative to the focus means.

16. The apparatus according to claim 12, wherein the prestored image processing algorithms are stored in a memory means located in the bus rack.

17. The apparatus according to claim 10, further comprising:
  filter means interposed between the focus means and sensing means for expanding the dynamic range of the sensing means and for changing the spectral responsivity characteristics of the sensing means to effect color measurements.

18. A method of enabling an automatic testing equipment to evaluate optical characteristics provided by a display unit in response to stimuli supplied thereto, the method comprising the steps of:
  placing the viewing area of the display unit in front of a reflective surface of a swingable mirror assembly;
  fixedly mounting a focus lens relative to the mirror assembly;
  moving along three directions a sensing means having a field of view and a plurality of detectors resident therein relative to the focus lens such that at least one chosen portion of the viewing area of the display unit is reflected by the reflective surface of the mirror assembly and projected by the focus lens onto the field of view of the sensing means;
  utilizing the detectors to measure the optical characteristics of the chosen projected portion; and
  analyzing the measured optical characteristics with prestored image processing algorithms to determine the performance of the chosen portion of the display unit.

19. The method according to claim 18, further comprising the steps of:
  dividing the viewing area of the display unit into a number of predefined portions;
  sequentially moving the sensing means relative to the focus lens such that each predefined portion of the viewing area is correspondingly projected onto the field of view of the sensing means;
  collecting and storing the optical characteristics of the successive portions; and
  analyzing the collected optical characteristics with prestored image processing algorithms to determine the performance of the display unit.

20. The method according to claim 18, further comprising the step of:
  utilizing filter means to expand the dynamic range of the sensing means and to change the spectral responsivity characteristics of the sensing means for effecting color measurements.

* * * * *

UNITED STATES PATENT AND TRADEMARK OFFICE
CERTIFICATE OF CORRECTION

PATENT NO. : 4,893,925
DATED : January 16, 1990
INVENTOR(S) : Kevin T. Sweeney, et al.

It is certified that error appears in the above-identified patent and that said Letters Patent is hereby corrected as shown below:

Column 3, line 33, change "xstage" to --x-stage--.

Column 4, line 36, change "sync" to --SYNC--.

Column 5, line 47, change "bY" to --by--.

Column 6, line 17, change "Y" to --y--.

Column 6, line 67, change "FIG." to --FIGS.--.

Column 7, line 64, change "swingable" to --swingably--.

Column 8, line 12, change "yaxis" to --y-axis--.

Column 8, line 15, change "direction" to --directions--.

Signed and Sealed this

Twelfth Day of February, 1991

*Attest:*

HARRY F. MANBECK, JR.

*Attesting Officer*     *Commissioner of Patents and Trademarks*